(12) United States Patent
Gao

(10) Patent No.: US 10,587,818 B2
(45) Date of Patent: Mar. 10, 2020

(54) VEHICLE VISION SYSTEM WITH ENHANCED CAMERA BRIGHTNESS CONTROL

(71) Applicant: MAGNA ELECTRONICS INC., Auburn Hills, MI (US)

(72) Inventor: Wenxue Gao, Waldaschaff (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 156 days.

(21) Appl. No.: 15/663,978

(22) Filed: Jul. 31, 2017

(65) Prior Publication Data

US 2018/0041713 A1    Feb. 8, 2018

Related U.S. Application Data

(60) Provisional application No. 62/369,775, filed on Aug. 2, 2016.

(51) Int. Cl.
  *H04N 5/243* (2006.01)
  *H04N 5/235* (2006.01)
  *H04N 5/57* (2006.01)
  *H04N 21/485* (2011.01)

(52) U.S. Cl.
  CPC ........... *H04N 5/243* (2013.01); *H04N 5/2354* (2013.01); *H04N 5/57* (2013.01); *H04N 21/4854* (2013.01); *G09G 2320/0653* (2013.01)

(58) Field of Classification Search
  CPC ........ H04N 5/243; H04N 5/2351; H04N 5/57; H04N 21/4854; H04N 2005/44517
  USPC ....................................................... 348/148
  See application file for complete search history.

(56) References Cited

U.S. PATENT DOCUMENTS

| | | |
|---|---|---|
| 5,530,240 A | 6/1996 | Larson et al. |
| 5,535,314 A | 7/1996 | Alves et al. |
| 5,550,677 A | 8/1996 | Schofield et al. |
| 5,668,663 A | 9/1997 | Varaprasad et al. |
| 5,670,935 A | 9/1997 | Schofield et al. |
| 5,724,187 A | 3/1998 | Varaprasad et al. |
| 5,949,331 A | 9/1999 | Schofield et al. |
| 6,329,925 B1 | 12/2001 | Skiver et al. |
| 6,690,268 B2 | 2/2004 | Schofield et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |

(Continued)

*Primary Examiner* — Joseph G Ustaris
*Assistant Examiner* — Matthew David Kim
(74) *Attorney, Agent, or Firm* — Honigman LLP

(57) ABSTRACT

A vision system for a vehicle includes a camera disposed at a vehicle and having a field of view exterior of the vehicle. A brightness control, responsive to processing of a frame of image data captured by the camera, interpolates towards an expected brightness for a next frame of captured image data by calculating a set of at least three brightness values using three different control coefficients derived from a previous frame of image data captured by said camera. The brightness control interpolates toward the expected brightness of the next frame of captured image data using the current expected brightness value and two of the three brightness values derived from the three control coefficients derived from the previous frame of captured image data.

20 Claims, 14 Drawing Sheets

(56) References Cited

U.S. PATENT DOCUMENTS

| | | |
|---|---|---|
| 7,338,177 B2 | 3/2008 | Lynam |
| 7,370,983 B2 | 5/2008 | DeWind et al. |
| 7,375,803 B1 | 5/2008 | Bamji |
| 7,446,650 B2 | 11/2008 | Scholfield et al. |
| 7,581,859 B2 | 9/2009 | Lynam |
| 7,626,749 B2 | 12/2009 | Baur et al. |
| 7,720,580 B2 | 5/2010 | Higgins-Luthman |
| 7,855,755 B2 | 12/2010 | Weller et al. |
| 8,446,470 B2 | 5/2013 | Lu et al. |
| 9,041,806 B2 | 5/2015 | Baur et al. |
| 9,126,525 B2 | 9/2015 | Lynam et al. |
| 9,264,672 B2 | 2/2016 | Lynam |
| 9,800,794 B2 | 10/2017 | Weber |
| 2002/0135743 A1* | 9/2002 | Gindele ............... G06T 5/008 355/18 |
| 2002/0163489 A1* | 11/2002 | Kuo ................. G09G 3/3406 345/89 |
| 2003/0103141 A1 | 6/2003 | Bechtel et al. |
| 2005/0206745 A1* | 9/2005 | Daiku ................ H04N 5/2357 348/226.1 |
| 2006/0050018 A1 | 3/2006 | Hutzel et al. |
| 2006/0061008 A1 | 3/2006 | Karner et al. |
| 2006/0164533 A1 | 7/2006 | Hsieh et al. |
| 2007/0097260 A1* | 5/2007 | Takeuchi ............... G09G 5/397 348/441 |
| 2011/0080421 A1* | 4/2011 | Capener ................ G09G 5/10 345/589 |
| 2011/0206280 A1* | 8/2011 | Lee ....................... G06T 5/009 382/167 |
| 2011/0292241 A1 | 12/2011 | Segapelli et al. |
| 2013/0250114 A1 | 9/2013 | Lu |
| 2013/0321476 A1* | 12/2013 | Botzas ................ G09G 3/3406 345/690 |
| 2014/0160284 A1 | 6/2014 | Achenbach et al. |
| 2014/0333729 A1 | 11/2014 | Pflug |
| 2014/0340510 A1 | 11/2014 | Ihlenburg et al. |
| 2014/0354811 A1 | 12/2014 | Weber |
| 2015/0022664 A1 | 1/2015 | Pflug et al. |
| 2015/0042806 A1 | 2/2015 | Wierich |
| 2015/0049193 A1 | 2/2015 | Gupta et al. |
| 2015/0245043 A1* | 8/2015 | Greenebaum .......... H04N 19/98 375/240.25 |
| 2016/0119600 A1* | 4/2016 | Kusuda ................ H04N 9/3179 348/744 |
| 2017/0122244 A1* | 5/2017 | Dufford ................ F02D 11/105 |
| 2018/0139368 A1* | 5/2018 | Nakayama ............ H04N 5/235 |
| 2018/0204310 A1 | 7/2018 | Junglas et al. |
| 2018/0302615 A1 | 10/2018 | Lehmann et al. |

\* cited by examiner

Resource utilization (with Oculus camera)

|                | Utilize | %    ( of XC7Z020) |
|----------------|---------|--------------------|
| Slice register | 986     | 0.93   ( of 106 440) |
| Slice LUT      | 4331    | 8.14   ( of 53 200)  |
| Block RAM      | 2       | 1.43   ( of 140)     |

VEHICLE VISION SYSTEM WITH ENHANCED CAMERA BRIGHTNESS CONTROL

CROSS REFERENCE TO RELATED APPLICATION

The present application claims the filing benefits of U.S. provisional application Ser. No. 62/369,775, filed Aug. 2, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a brightness control that controls brightness parameters of the camera or image sensor. An image processor is operable to process image data captured by the camera. The brightness control, responsive to brightness values of a previous frame of image data, interpolates towards an expected brightness by calculating a set of at least three brightness values from the previous frame of image data with three different control coefficients, from which two are chosen in between set points (of expected or desired brightnesses) for further processing. The system repeats this process over multiple frames of captured image data, adjusting the coefficients based the previous frame and on an error between the previous frame brightness and the expected brightness, to adjust the camera brightness until it is within a threshold level from the expected brightness.

These and other objects, advantages, purposes and features of the present invention will become apparent upon review of the following specification in conjunction with the drawings.

BRIEF DESCRIPTION OF THE DRAWINGS

FIG. 10 is a table showing resource utilization;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
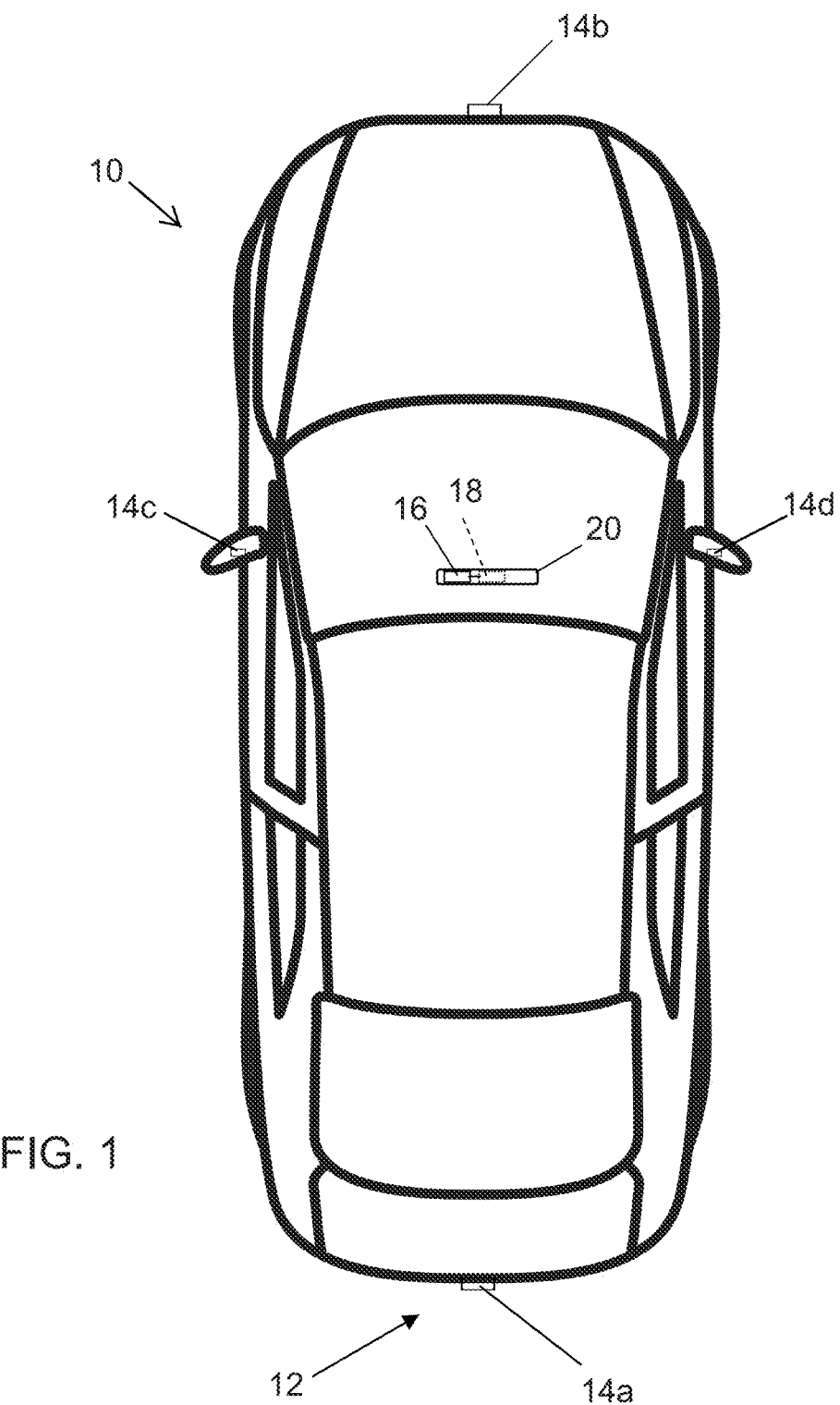
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward facing imaging sensor or camera 14a (and the system may optionally include multiple exterior viewing imaging sensors or cameras, such as a forward viewing camera 14b at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
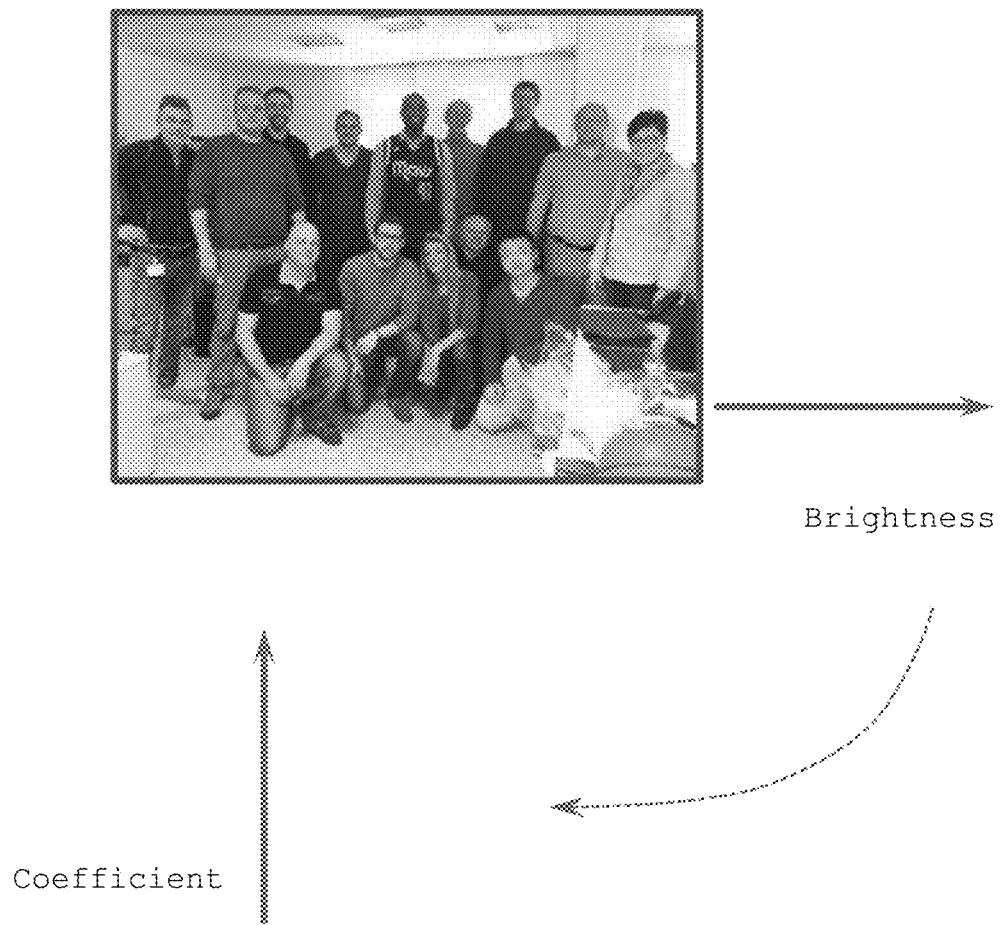
FIGS. 2 and 3 are schematics showing known brightness control.

Conventional vehicle camera brightness controls typically employ a loop control. The brightness output is the feedback for the deviation from the desired brightness set point. The brightness can be calculated under use of a cumulative histogram, where, for example, the 80 percent bin may be the indicator of the brightness. To decrease or increase the brightness, there may be a coefficient which is a gain factor to the pixels before running the cumulative histogram. The coefficient can be a controlling parameter in a non-linear function, for example, a hyperbolic tangent function. By that the coefficient can be used as control for the brightness. Since the histogram's profile varies, the histogram cannot be expressed as a continuous mathematical function, and the single pixel's brightness is not linearly linked to the cumulative brightness result, the optimal coefficient cannot be calculated a priori, but must be estimated or assumed as best as possible in advance of each frame. A typical way is to predict the best coefficient for the next frame from the knowledge of the previous frames, so by loop (or feedback) control, is illustrated in FIG. 2.

The brightness (loop) control is typically a PID-, PD-, DI-, or PI-, or just a P-type. The parameters of the proportional, the integral and the differential control part are typically fixedly set. In case the overall dampening is below one, the system adapts to the (user desired) set point faster, but overshoots more and oscillates longer, and in the case the overall system's dampening above one, there is no or less over swing, but the desired set point or image brightness changes are reached later. Over swing, oscillation and slow brightness adaption are not desired in brightness control. The parameters of proportional-integral-derivative (PID) controls are typically set (optimized) in a way that the system dampening is close to 1, but since the control system is not continuous, there is no optimal PID setting. A PID controlled brightness control setting may be a compromise between the lackings of being slow or over swinging. A brightness always varies (needs to be adapted to) when the light condition in the capture image changes and the dynamic range of the camera, display and/or processing system is not wide enough.

Brightness Control in Practice:

Brightness control approaches mainly fall into 2 categories:

(1) Within the image sensor. The brightness parameters, such as target brightness, integration time and/or global gain, are sent via I2C from the control unit to the image sensor. Then the image sensor updates those parameters for next frames and then the brightness has new values. A benefit of this approach is that the image sensor takes over the brightness adaption natively. However, I2C communication is slow and the reaction for the parameter change is slow.

(2) After the image sensor. The image sensor has the constant parameters related to brightness. The control unit processes the raw image and outputs a new image with expected brightness. A benefit of this approach is that the image sensor keeps in the same state and the user can elaborate specific brightness control strategy. However, additional effort may be needed for the control unit design.

Figure 3:
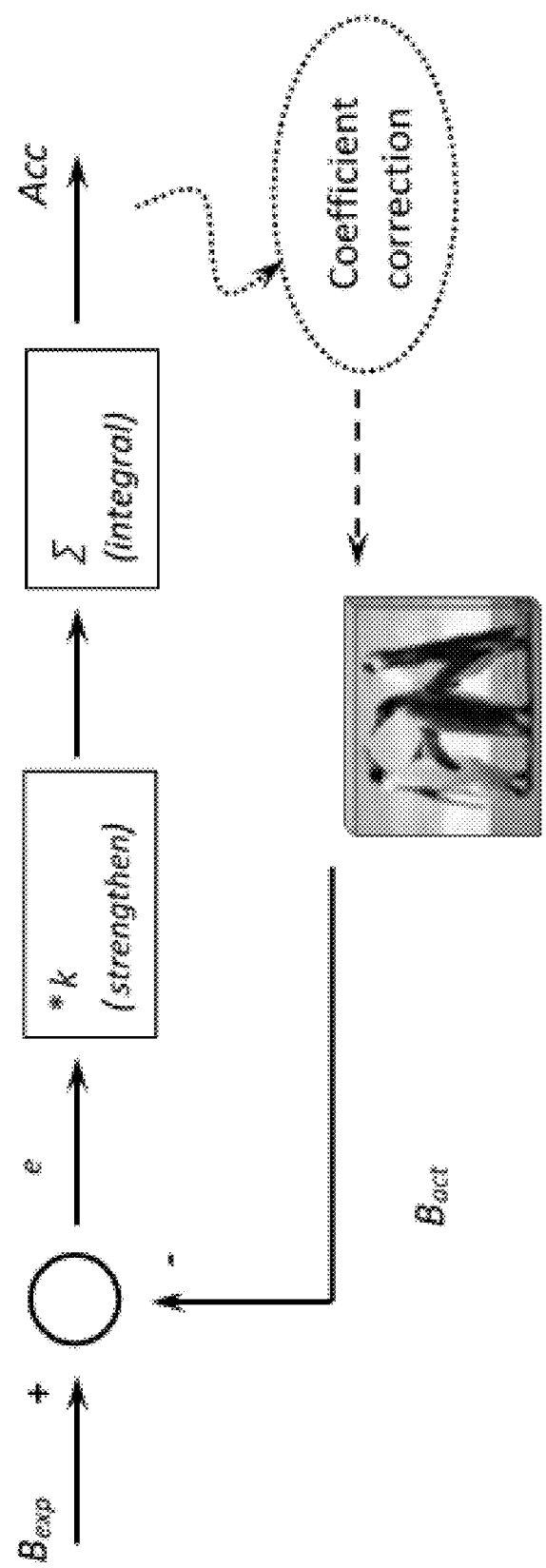

For the second approach, PID control is popular, such as shown in FIG. 3. PID is also available for the first approach.

Figure 6:
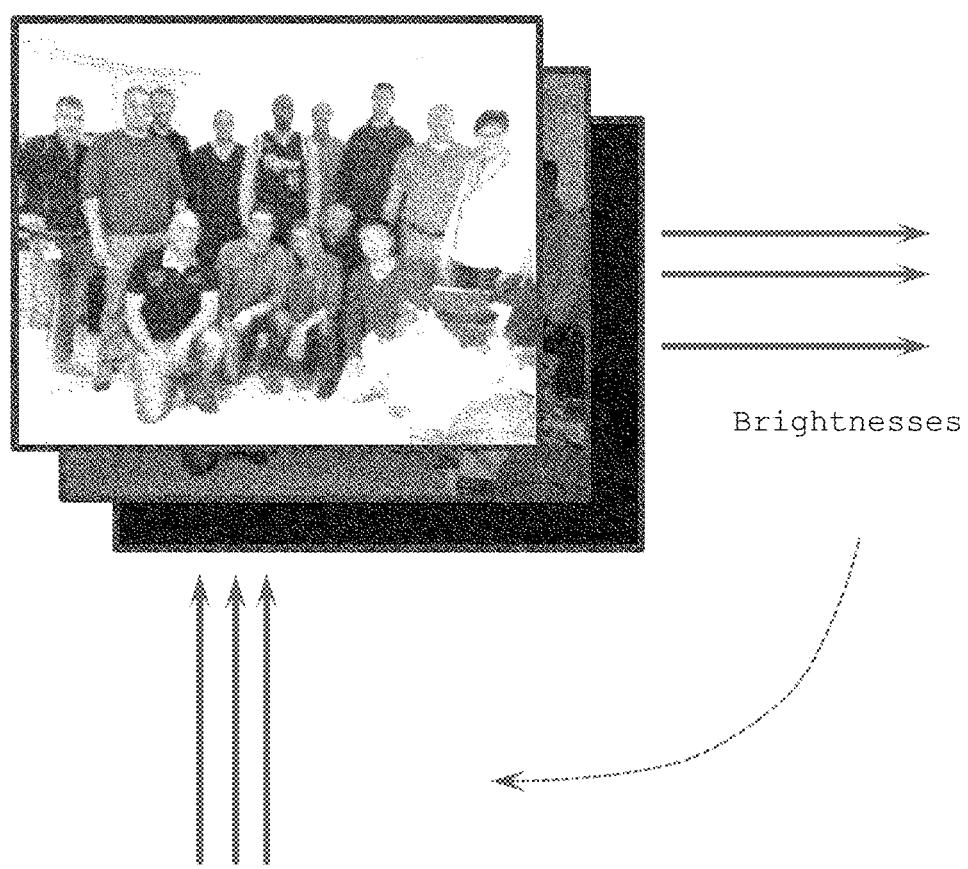
FIG. 6 is a schematic showing a brightness control process in accordance with the present invention.

Instead of using an comparably slow PID control for adapting the output brightness to a varying input brightness, the camera brightness control of the present invention interpolates towards the set point (expected brightness $B_{exp}$) by calculating a set of three (or five or optionally more) brightnesses from three (or five or optionally more) different control coefficients, from which two are chosen in between the set points, for further processing (see FIG. 6). This may be done in a control of category two (after the image sensor).

Figure 4:
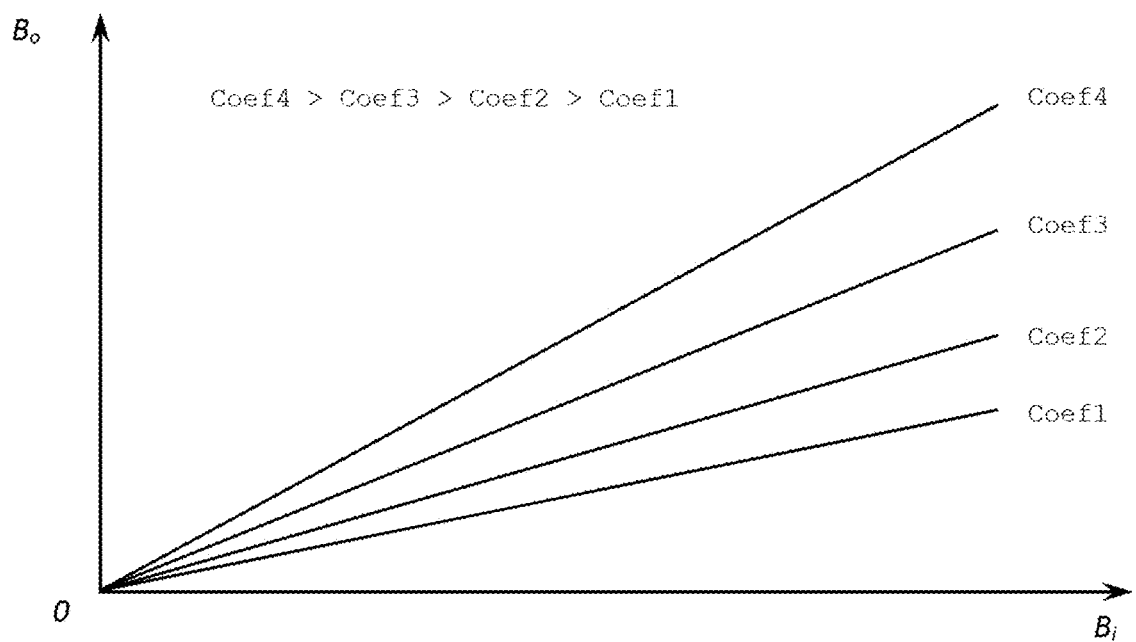
FIG. 4 shows a brightness transfer function, where the $B_i$ axis is the actual pixel brightness and the $B_o$ axis is the output brightness, shown with four exemplary global coefficient's curves, with the control dependency being linear which would be ideal.
Figure 5:
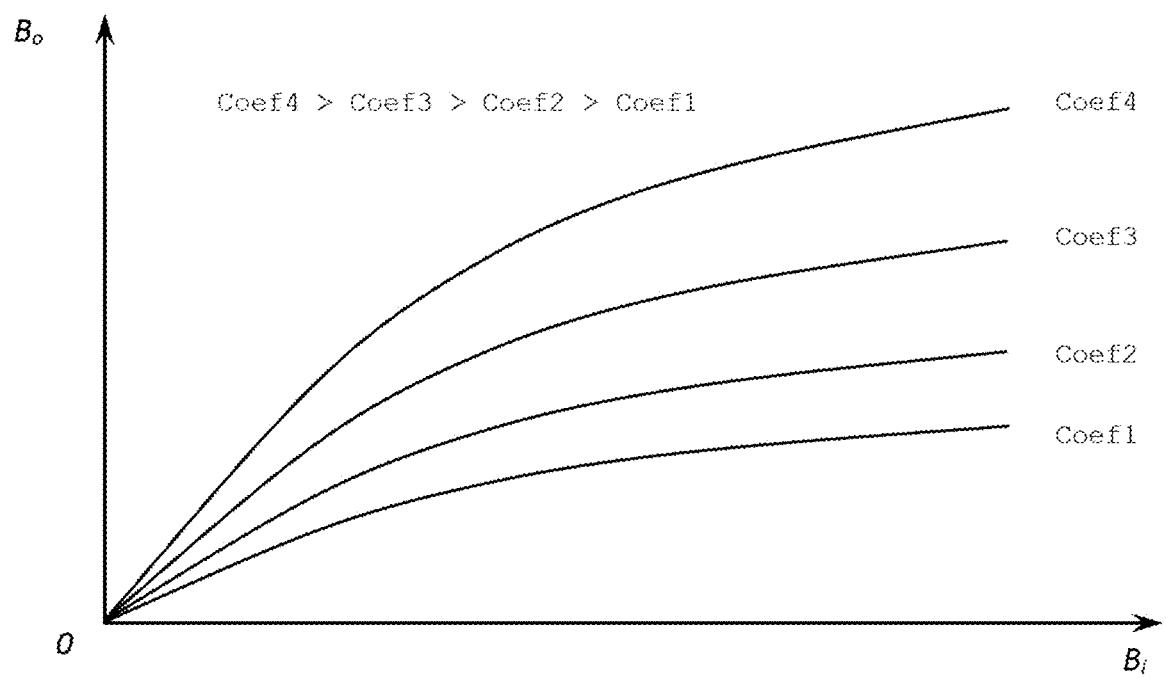
FIG. 5 shows a brightness transfer function, where the $B_i$ axis is the actual pixel brightness and the $B_o$ axis is the output brightness, shown with four exemplary global coefficient's curves, with the control dependency being non-linear.

For example, for every current frame of image or image data, there are two hidden frames running parallel (instantaneously) with it. These three frames of image data have their own brightness coefficients and brightness result. Due to the nonlinearity between the coefficient and the brightness (see FIGS. 4 and 5 in comparison) and the discontinuous behavior, this solution gives a more stable and faster brightness tracing without overshooting (see FIGS. 11 and 12) compared to a PID controlled brightness control. Switching between the brightness coefficients according the present invention essentially equates to a switching between I (Integral) coefficients. Making the coefficient a function of the error makes the I-component adaptive to the deviation. The adaption may be proportional, exponential or any other function or may be a discontinuous relationship. By that the control of the present invention is an I-type with optional deviation (or error) adaptive I-parameter (or coefficient). The varying I parameter determines the slope at which the actual brightness value conveys towards the expected brightness value (set point).

Figure 7:
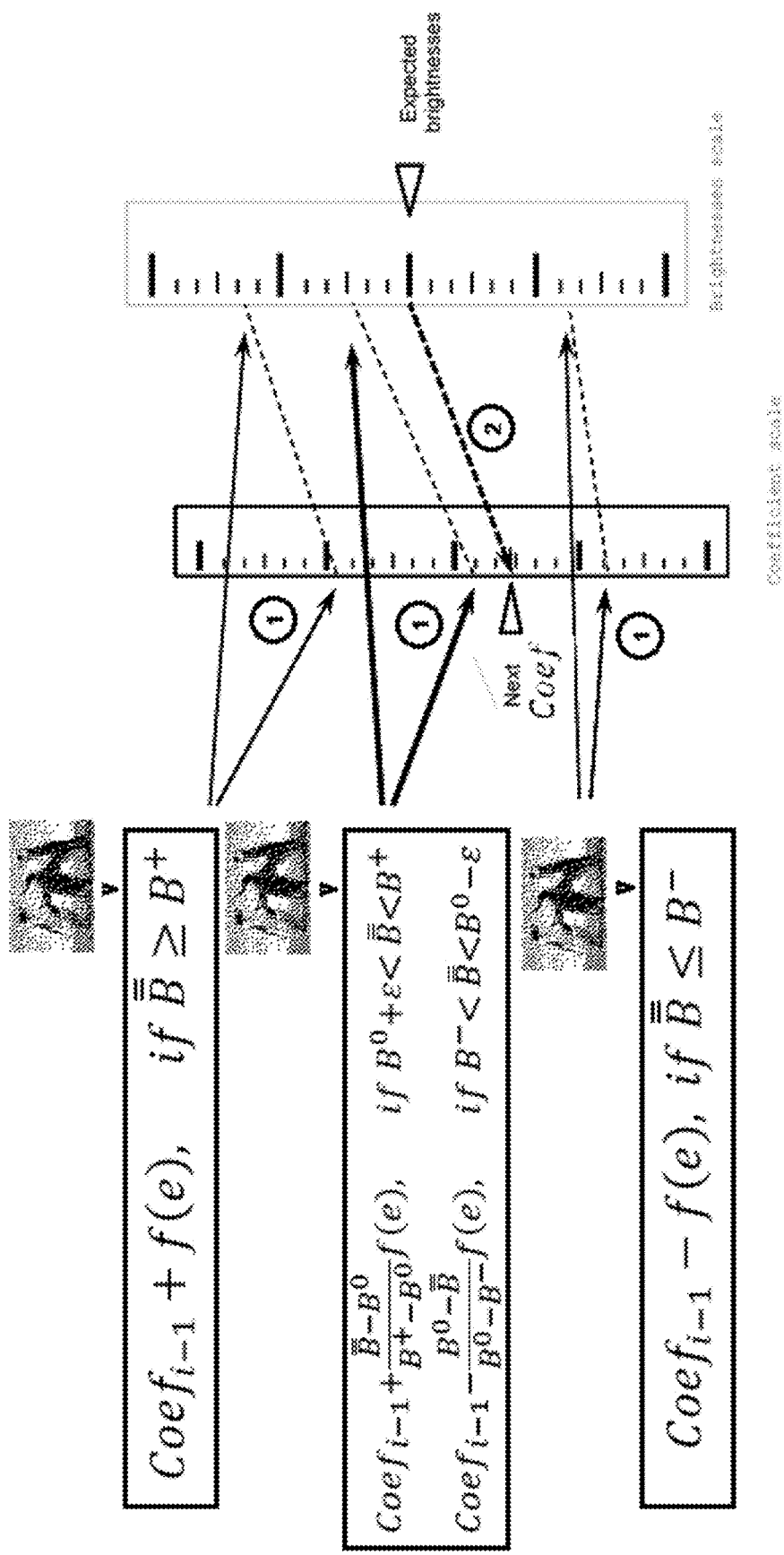
FIG. 7 is a schematic in accordance with the present invention showing how three brightness values get determined from three coefficients (from the coefficient of a former frame i–1 plus/minus a deviation of a function of the difference e (of the actual brightness and the expected brightness, or simpler a constant (fixed delta)) in a first step (1) and (backward-) interpolating a new coefficient of the current frame i from the ratio of the expected brightness to the two closest determined brightness results in a second step (2)
Figure 11:
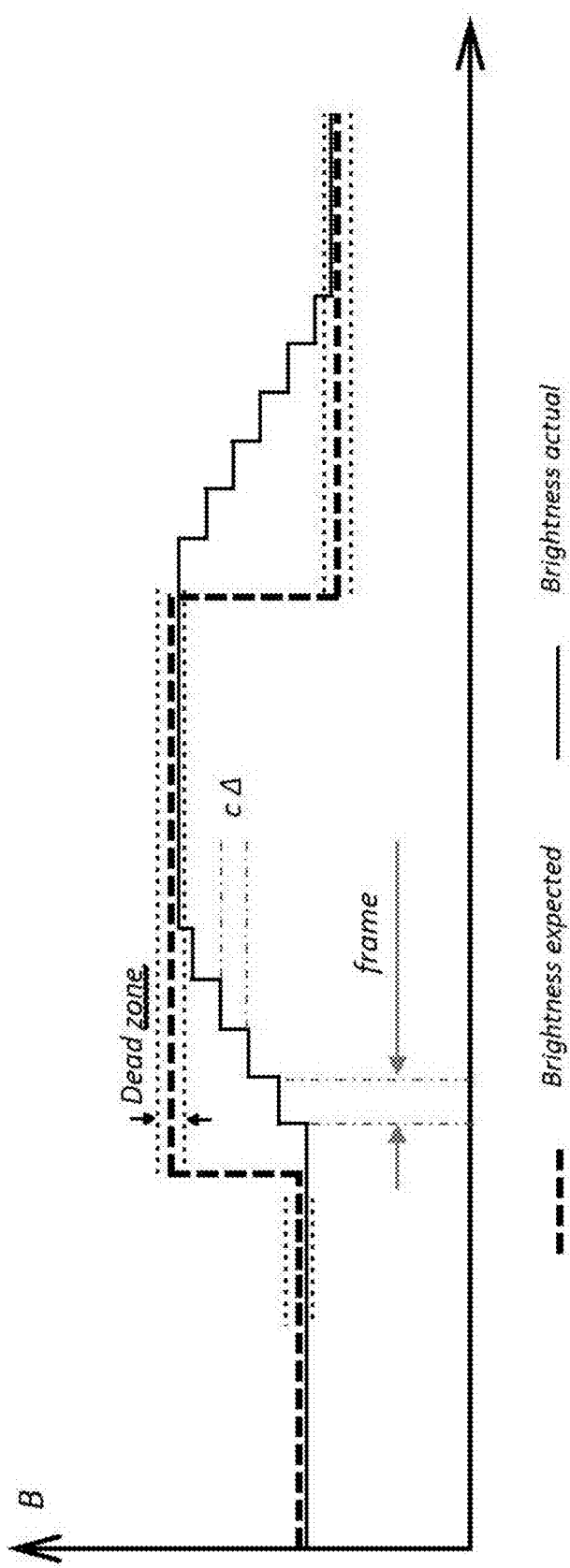
FIG. 11 shows trace properties of a brightness control algorithm according the invention, where the actual brightness steps are proportional to the Δ value ($f(e)=\Delta$)
Figure 12:
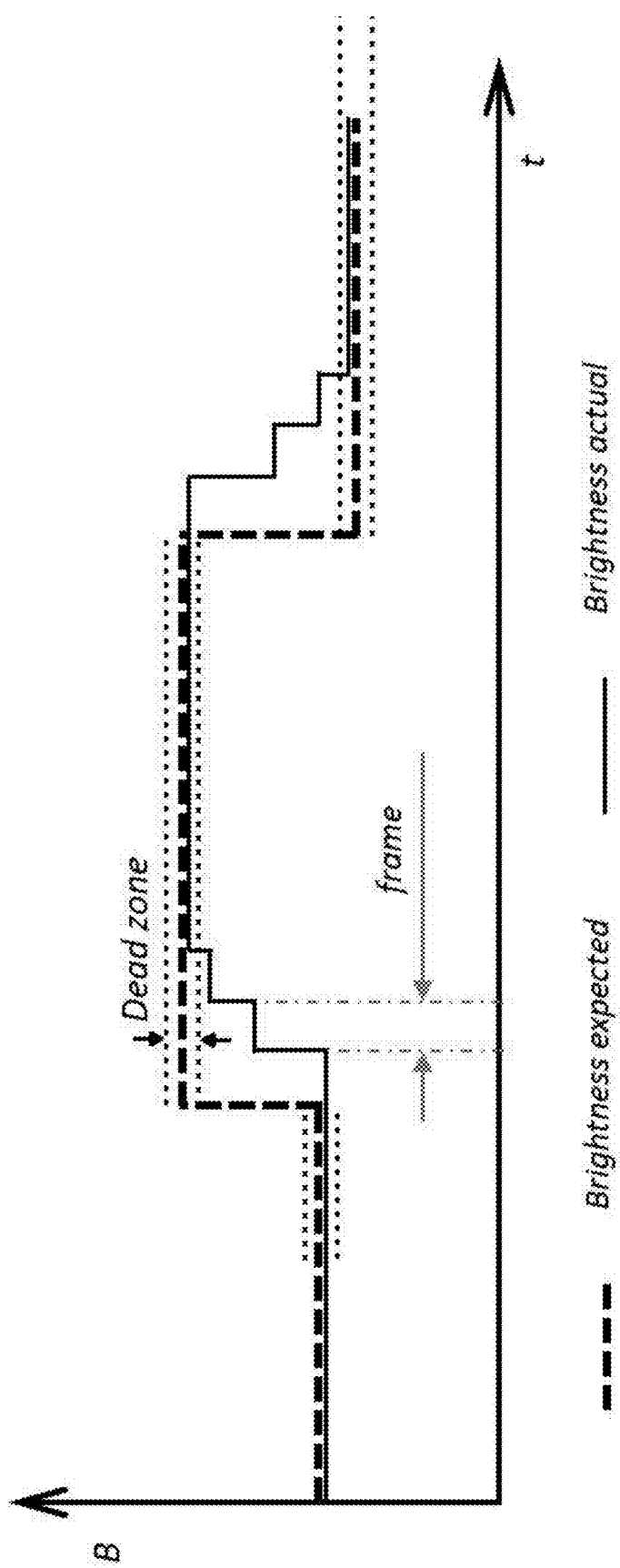
FIG. 12 shows trace properties of a brightness control algorithm according the invention, where the function of the difference e is $f(e)=k*e$ (proportional, continuous and linear) such as with being a scaling factor coefficient.
Figure 13:
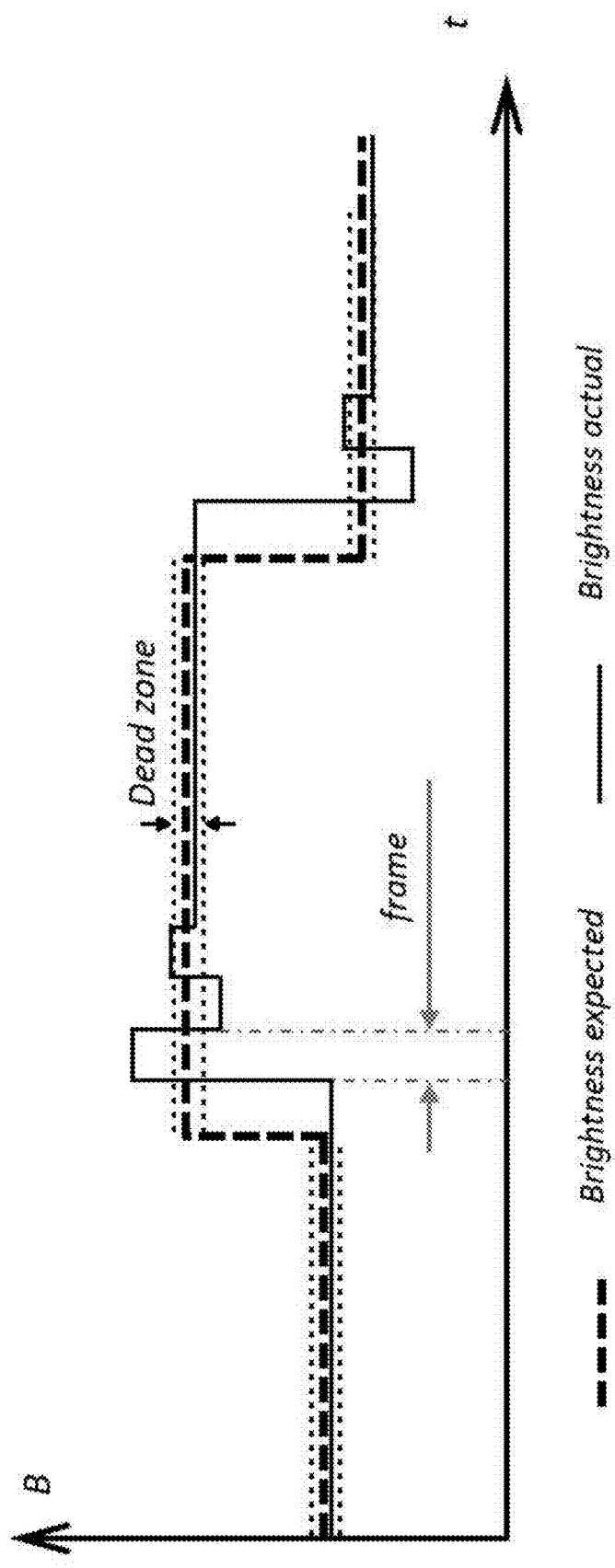
FIG. 13 shows trace properties of a brightness control algorithm according the invention, where the function of the difference e is $f(e)=k*e$ with p being chosen high so that the system adapts quickly but swings more than one time past a brightness set point jump stimuli.

Note that in FIG. 7, $f(e)$ is a function of the current difference (or error) e (as in FIG. 3), which means that, for larger brightness variation between frames, the trying scope $f(e)$ will also be larger, and vice versa. The function $f(e)$ can be linear, non-linear (such as, for example, an exponential curve, a saturation curve, hyperbolic, or a polygon) or discontinuous. In practice, it may be sufficient to set this function as a constant to simplify the implementation, for example, $f(e)=\Delta$ (an according slope diagram is shown in FIG. 11). FIG. 12 shows an example of a trace property of an algorithm, where the function of the difference "e" (for error) is proportional (and continuous) ($f(e)=k*e$; with k as a constant).

Figure 8:
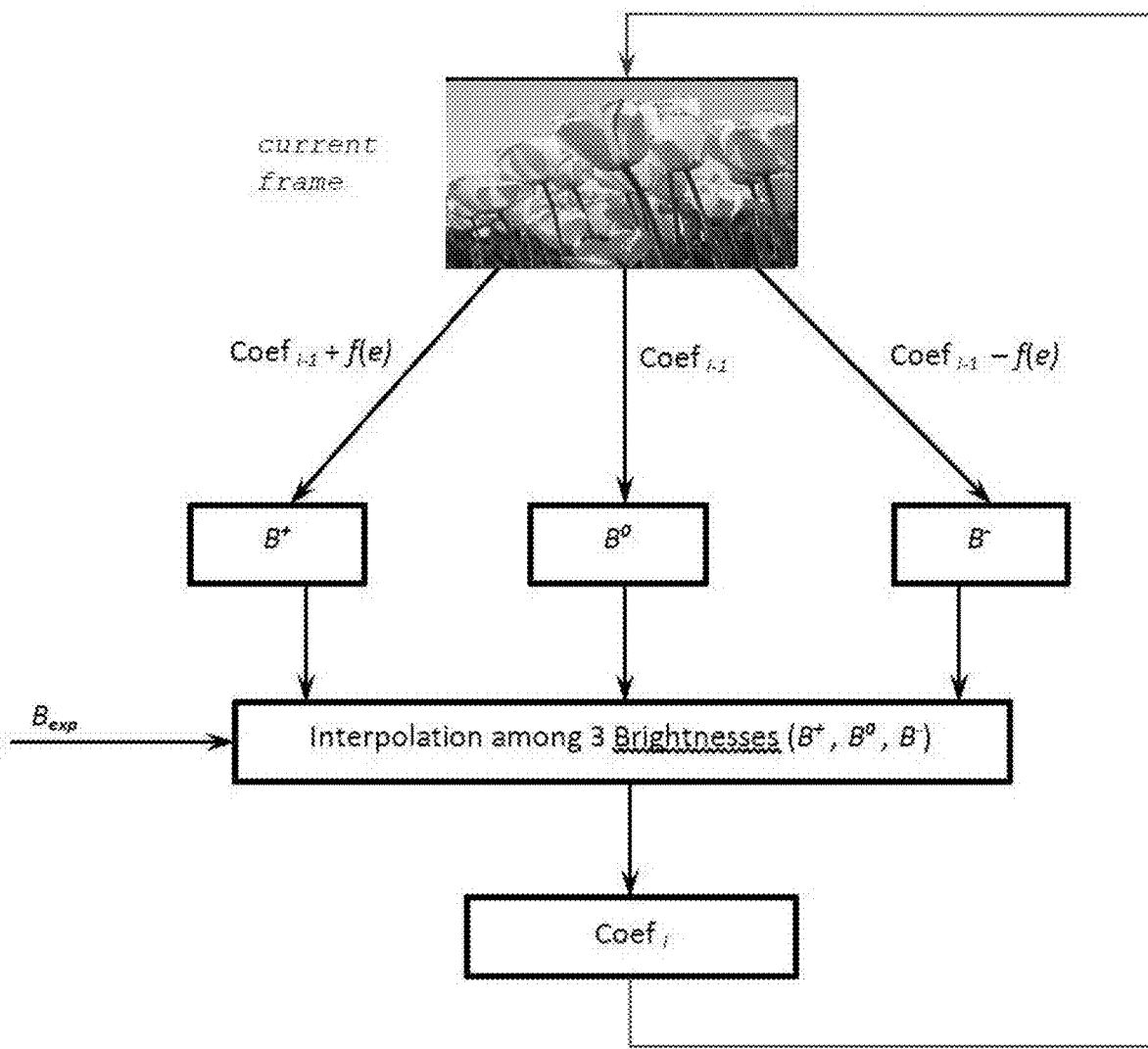
FIG. 8 is a flow chart of the coefficient determination of the current frame using the steps shown in FIG. 7 in accordance with the present invention.

The present invention provides enhanced fast online brightness control through coefficient interpolation (see FIGS. 7 and 8):

$$\frac{\partial |e|}{\partial C_i} = \frac{\partial}{\partial C_i}(|B(C_i) - B_{exp}|) \to 0, C^- \leq C_i \leq C^+,$$

under use of the minimal brightness deviation e:

$$\min(e) = \min(|B(C_i) - B_{exp}|), B^- \leq B \leq B^+.$$

Figure 9:
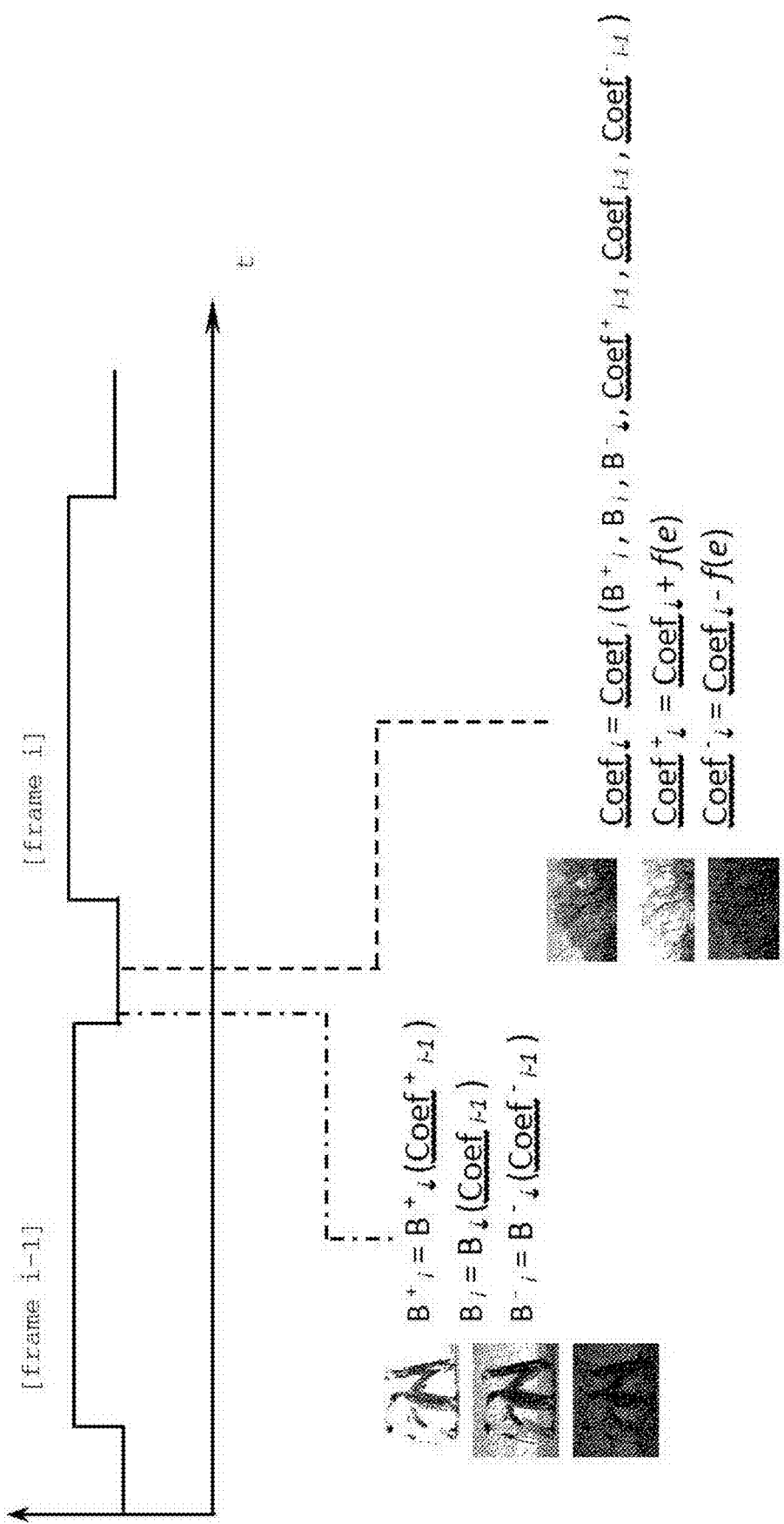
FIG. 9 is a timing diagram of the coefficient determination of the current frame using the steps shown in FIG. 7 in accordance with the present invention.

Image brightness (B) is controlled by a coefficient (C), in the solution of the present invention (see FIG. 9), by a knee-point parameter for the global brightness adjustment. The coefficient has good correlation (for example, tan h) to the image brightness and does not impact the original image sensor behavior. This means that the coefficient is calculated in a shorter time period and can be used at once for the next image.

Conventionally, a brightness control requirement may be fulfilled by PID control. But for real-time purposes, the PID introduces complexity of parameter selection. The PID control has at least 3 parameters to adjust and it is difficult to find an optimal combination for all lighting conditions.

The system or control of the present invention takes advantage of field-programmable gate array (FPGA) parallel processing on the original image and has 3 versions of brightness values out of 3 different previous coefficients simultaneously. The 3 coefficients are chosen as the previous coefficient ($Coef_{i-1}$), a larger coefficient (+) and a smaller coefficient (−), so that there are correspondingly 3 brightness value results (B, $B^+$ and $B^-$). The next coefficient ($Coef_i$) is calculated by interpolation among these 3 coefficients with respect to smallest error to the 3 brightness values. Since the FPGA cannot hold the current frame in memory, the new coefficient may be used for the next frame's brightness determination. Optionally, with very fast systems or systems with long frame pause time and a frame memory, the brightness of the current frame may be calculated out of the new found coefficient instantaneously.

The interpolation works as in the formula below, where $\overline{B}$ denotes expected brightness and ε the dead-zone. In the strip of $\|\varepsilon\|$ the brightness $Coef_i$ will not change.

$$Coef_i = \begin{cases} Coef_{i-1} + f(e), & \text{if } \overline{B} \geq B^+ \\ Coef_{i-1} + \dfrac{\overline{B} - B^0}{B^+ - B^0} f(e), & \text{if } B^0 + \varepsilon < \overline{B} < B^+ \\ Coef_{i-1} - \dfrac{B^0 - \overline{B}}{B^0 - B^-} f(e), & \text{if } B^- < \overline{B} < B^0 - \varepsilon \\ Coef_{i-1} f(e), & \text{if } \overline{B} \leq B^- \end{cases}$$

A dead-zone $\|\varepsilon\|$ is needed to have a stable video (nun pumping or flickering). The dead zone $\|\varepsilon\|$ may be a tolerance band above and below the error e (see FIGS. 11-14).

Figure 14:
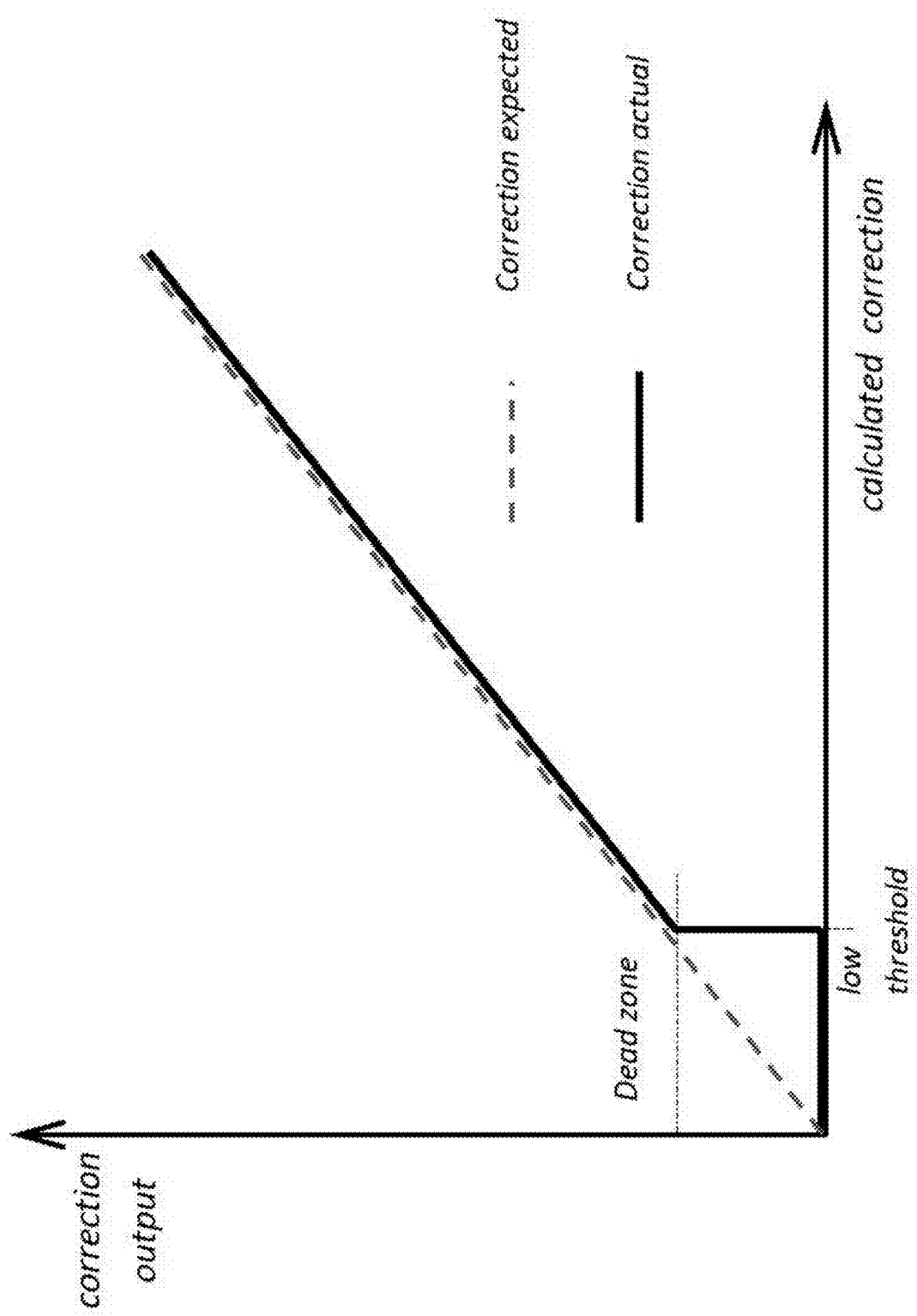
FIG. 14 shows a graph of the correction (coefficient) output in dependency of the calculated correction (coefficient), with the lower end truncated to zero (dead zone)

In case the calculated coefficient correction (as a function of the current difference or error e) is within the dead zone boundary, the correction will be ignored so the new brightness coefficient will be identical to the former, see FIG. 14. Optionally, inside the dead-zone, an accumulative deviation may be used for a fine tuning.

FIG. 11 shows a trace property of this algorithm, where the actual brightness steps are proportional to the Δ value ($f(e) = \Delta$). On a brightness jump stimuli the control is ramping towards the set point in identical step width. A litte delta remains when the actual value is close to the set point, hitting the dead zone.

When an algorithm according the invention uses a function of the difference e which is linear such as being $f(e) = k \ast e$, with k being a scaling factor coefficient or non-linear such as being $f(e) = 2^{k \ast e}$, with k being a scaling factor coefficient in the exponent the convergence to the actual brightness may be significantly faster.

FIG. 12 shows a trace property of an algorithm, where the function of the difference e is proportional (and continuous), such as being $f(e) = k \ast e$, with k being a scaling factor coefficient. On a brightness jump stimuli the control is ramping towards the set point in larger steps at the beginning and smaller steps at the end. A litte delta remains when the actual value is close to the set point, hitting the dead zone. No overshooting appears. The factors may be chosen properly. Attention should be paid with this variable correction algorithm that the acceleration factor is not too large to get a stable brightness tracing (swinging) (see FIG. 13). For the fastest control setting, the factor may always be aligned with $\|\varepsilon\|$ so that the $\|\varepsilon\|$ band may be reached past one over swing in maximum.

Figure 15:
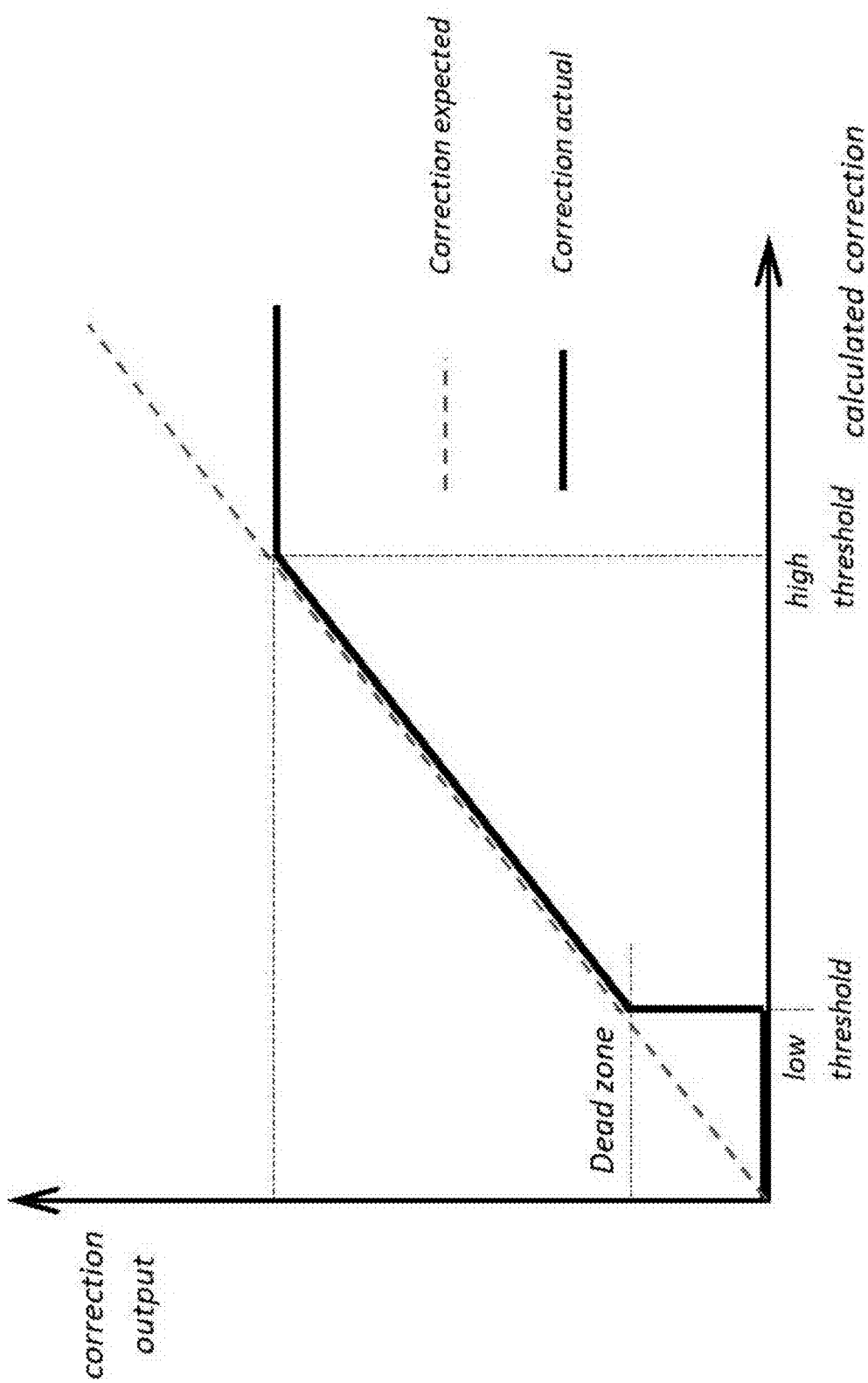
FIG. 15 shows a graph of the correction (coefficient) output in dependency of the calculated correction (coefficient), with the lower end truncated to zero (dead zone) and the top end limited to a maximum value.

Optionally, the coefficient may be limited to a maximal value, shown in the graph of FIG. 15. A benefit of this solution is a better and faster convergence together with a high stability. This approach avoids over-tuning even under quickly alternating lighting conditions. The computational operations are limited to multiplications and summations easy to implement in FPGAs.

With extreme lighting conditions (too bright and too dark), the control module can change the global gain or integration time of the image sensor in very low possibility.

This brightness control can also target on a sub region, such as a region of interest (ROI).

Optionally, the system of the present invention may incorporate image noise filtering methods and algorithms such as by utilizing aspects of the vision systems described in U.S. Publication No. US-2015-0042806, which is hereby incorporated herein by reference in its entirety.

Optionally, the system of the present invention may incorporate enhanced low light capability methods and algorithms such as by utilizing aspects of the vision systems described in U.S. Publication No. US-2014-0354811, which is hereby incorporated herein by reference in its entirety.

Optionally, the system of the present invention may incorporate shading correction methods and algorithms such as by utilizing aspects of the vision systems described in U.S. provisional application Ser. No. 62/448,091, filed Jan. 19, 2017, which is hereby incorporated herein by reference in its entirety.

Optionally, the system of the present invention may incorporate test methods and devices such as by utilizing aspects of the vision systems described in U.S. provisional application Ser. No. 62/486,072, filed Apr. 17, 2017, which is hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:

a camera disposed at a vehicle and having a field of view exterior of the vehicle;

a processor operable to process image data captured by said camera;

a brightness control; and wherein said brightness control, responsive to image processing of a current frame of image data captured by said camera, interpolates towards an expected brightness for a next frame of captured image data by calculating a set of at least three brightness values using three different control coefficients derived from a previous frame of image data captured by said camera, and wherein said brightness control interpolates toward the expected brightness of the next frame of captured image data using the current expected brightness value and two of the three brightness values derived from the three control coefficients derived from the previous frame of captured image data.

2. The vision system of claim 1, wherein said vision system processes each frame of captured image data as three frames, each having its own control coefficient and brightness value.

3. The vision system of claim 1, wherein the three control coefficients are selected as a previous control coefficient, a larger control coefficient and a smaller control coefficient, so that there are correspondingly three brightness values.

4. The vision system of claim 3, wherein a next control coefficient is calculated by interpolation among the three selected control coefficients with respect to the three brightness values.

5. The vision system of claim 3, wherein the larger and smaller control coefficients are at least in part derived from an error value that is determined as the difference between an expected brightness and brightness from a previous frame of captured image data.

6. The vision system of claim 5, wherein the three control coefficients comprise a base control coefficient, an upper control coefficient that comprises the base control coefficient plus the error value, and a lower control coefficient that comprises the base control coefficient minus the error value.

7. The vision system of claim 5, wherein said brightness control selects one of the control coefficients based on the expected brightness level compared to the three brightness levels, and wherein the selected control coefficient is applied to the brightnesses determined from the next frame of captured image data.

8. The vision system of claim 4, wherein the larger and smaller control coefficients are at least in part derived from a function of an error value that is determined as the difference between an expected brightness and brightness from a previous frame of captured image data.

9. The vision system of claim 8, wherein the function comprises a non-linear function.

10. The vision system of claim 8, wherein the function comprises a linear function.

11. The vision system of claim 1, wherein said brightness control interpolates towards an expected brightness when a difference between the current brightness and the expected brightness is greater than a threshold level.

12. A method for adjusting a brightness setting of a camera for a vehicular vision system, said method comprising:
(a) providing a camera configured to be disposed at a vehicle so as to have a field of view exterior of the vehicle;
(b) providing a processor operable to process image data captured by the camera;
(c) providing a brightness control operable to control the brightness setting of the camera;
(d) capturing a current frame of image data by the camera;
(e) processing the current frame of image data to determine a difference between an actual brightness for the current frame of image data and an expected brightness for the current frame of image data;
(f) determining three coefficients for the current frame of image data derived from the difference between the actual brightness for the current frame of image data and the expected brightness, wherein at least some of the three coefficients are derived from a previous frame coefficient and the difference between the actual brightness for the current frame of image data and the expected brightness;
(g) applying the three coefficients for the current frame of image data to the current frame of image data to determine three brightness values for the current frame of image data, each of the three brightness values derived from a respective one of the three coefficients;
(h) interpolating the expected brightness and the three brightness values to determine a frame coefficient that will be used as the previous frame coefficient during processing of a subsequent frame of image data; and
(i) repeating steps (d) to (h) until the difference between the actual brightness and the expected brightness for the then current frame of image data is within a threshold range.

13. The method of claim 12, wherein the three coefficients for the current frame of image data are selected as a mid-coefficient, a larger coefficient and a smaller coefficient, so that there are correspondingly three brightness values.

14. The method of claim 13, wherein the larger and smaller coefficients are at least in part derived from the difference between the expected brightness and actual brightness from the previous frame of captured image data.

15. The method of claim 14, wherein the larger coefficient comprises the mid-coefficient plus the difference value, and the smaller coefficient comprises the mid-coefficient minus the difference value.

16. The method of claim 12, wherein said camera continues to capture image data and said brightness control continues to interpolate towards an expected brightness as long as the difference between the brightness of the then current frame of image data and the expected brightness is greater than a threshold level.

17. The method of claim 12, wherein determining three coefficients derived from the difference between the actual brightness for the current frame of image data and the expected brightness comprises determining three coefficients derived from a function of the difference.

18. The method of claim 17, wherein the function comprises a non-linear function.

19. A vision system for adjusting a brightness setting of a camera for a vehicular vision system, said vision system comprising:
a camera configured to be disposed at a vehicle so as to have a field of view exterior of the vehicle;
a processor operable to process frames of image data captured by the camera;
a brightness control operable to control the brightness setting of the camera;
wherein, responsive to processing a current frame of image data captured by the camera, said brightness control determines a difference between an actual brightness for the current frame of image data and an expected brightness;
wherein said brightness control determines three coefficients based at least in part on the difference between the actual brightness for the current frame of image data and the expected brightness for the current frame of image data captured by the camera;
wherein at least some of the three coefficients are derived from a previously determined coefficient determined via processing a previous frame of captured image data;
wherein said brightness control applies the three coefficients for the current frame of image data to the current frame of image data to determine three brightness values for the current frame of image data, each of the three brightness values derived from a respective one of the three coefficients;
wherein said brightness control interpolates the expected brightness and the three brightness values to determine a current frame coefficient that will be used as a previous frame of image data coefficient during processing of a subsequent frame of image data; and
wherein said vision system continues to process frames of captured image data until the difference between the actual brightness and the expected brightness for a current captured frame of image data is within a threshold range.

20. The vision system of claim 19, wherein the three coefficients are derived from a function of the difference between the actual brightness for the current frame of image data and the expected brightness, and wherein the function comprises a non-linear function.

* * * * *